United States Patent
Stachura et al.

(10) Patent No.: US 6,754,209 B1
(45) Date of Patent: Jun. 22, 2004

(54) METHOD AND APPARATUS FOR TRANSMITTING AND RECEIVING NETWORK PROTOCOL COMPLIANT SIGNAL PACKETS OVER A PLATFORM BUS

(75) Inventors: Thomas L. Stachura, Portland, OR (US); Carey W. Smith, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/141,837

(22) Filed: Aug. 28, 1998

(51) Int. Cl.⁷ ............................................. H04L 12/56
(52) U.S. Cl. .................... 370/389; 370/466; 370/474
(58) Field of Search ............................ 370/463, 389, 370/474, 469, 470, 466

(56) References Cited

U.S. PATENT DOCUMENTS

| | | | |
|---|---|---|---|
| 5,528,590 A | * | 6/1996 | Iidaka et al. |
| 5,551,052 A | | 8/1996 | Barnes et al. |
| 5,796,734 A | | 8/1998 | Izawa et al. |
| 5,860,081 A | | 1/1999 | Herring et al. |
| 6,307,857 B1 | * | 10/2001 | Yokoyama .................. 370/395 |
| 6,311,230 B1 | * | 10/2001 | Cochran et al. ............... 710/5 |

* cited by examiner

*Primary Examiner*—Kenneth Vanderpuye
(74) *Attorney, Agent, or Firm*—Libby H. Hope

(57) ABSTRACT

Briefly, in accordance with one embodiment of the invention, a platform bus interface unit includes circuitry to divide a received network protocol compliant signal packet into signal packets of a smaller size for transmission over a platform bus of at least a portion of the data provided by the network protocol compliant signal packet.

Briefly, in accordance with another embodiment of the invention, an integrated circuit includes circuitry to transmit over a platform bus at least a portion of the data provided by a network protocol compliant signal packet as signal packets of a smaller size.

Briefly, in accordance with still another embodiment of the invention, a method of transmitting at least a portion of the data provided by a network protocol compliant signal packet over a platform bus includes the following. At least a portion of the data provided by the network protocol compliant signal packet is divided into smaller data subsets. The smaller data subsets are transmitted over the platform bus as platform bus protocol compliant signal packets. The maximum amount of data capable of being provided by a network protocol compliant signal packet exceeds the maximum amount of data capable of being provided by a platform bus protocol compliant signal packet.

Briefly, in accordance with still yet another embodiment of the invention, a method of combining into a network protocol compliant signal packet at least a portion of the data provided by separate signal packets received over a platform signal bus includes the following. At least a portion of the data provided by the signal packets received is extracted. The extracted data is assembled into a single network protocol compliant signal packet.

9 Claims, 6 Drawing Sheets

FIG. 6

| F | L | Explanation |
|---|---|---|
| "1" | "0" | First Block of Fragmented Signal Stream |
| "0" | "0" | Middle Block of Fragmented Signal Stream |
| "0" | "1" | Last Block of Fragmented Signal Stream |
| "1" | "1" | First and Last Block (i.e., 32 Bytes or Less of Data) |

FIG. 7

| F | L | Explanation |
|---|---|---|
| "1" | "0" | First Block of Fragmented Signal Stream |
| "0" | "0" | Middle Block of Fragmented Signal Stream |
| "0" | "1" | Last Block of Fragmented Signal Stream |
| "1" | "1" | First and Last Block (i.e., 32 Bytes or Less of Data) | ns

METHOD AND APPARATUS FOR TRANSMITTING AND RECEIVING NETWORK PROTOCOL COMPLIANT SIGNAL PACKETS OVER A PLATFORM BUS

RELATED APPLICATION

This patent application is related to U.S. patent application Ser. No. 09/136,870 now U.S. Pat. No. 6,385,214, titled "Network Controller," by Steven D. Williams, et al., filed Aug. 19, 1998, assigned to the assignee of the present invention and herein incorporated by reference.

BACKGROUND

1. Field

The present invention is related to transmitting and/or receiving network protocol compliant signal packets and, more particularly, transmitting and/or receiving such network protocol compliant signal packets over a platform bus.

2. Background Information

As is well-known, with advances in state-of-the-art technology, computing platforms are coming equipped with circuitry and software that permits the computing platform to be managed remotely via a network. For example, it is becoming desirable to have the capability to diagnose and, in some instances, address problems from a remote network management application executing on a remote server or other computing platform. In this context, the term computing platform refers to any hardware and/or software system that includes the capability to perform logic and/or arithmetic operations. It includes, without limitation, computers, personal computers, laptop computers, servers, set-top boxes, digital signal processor based-systems, and the like. Of course, one disadvantage of providing this capability is an increase in cost for the computing platform that is to be managed remotely. Typically, such computing platforms must include the capability to communicate via a network, such as including the capability to transmit and/or receive network protocol compliant signal packets. Although this capability is typically being included in computing platforms, such as in a motherboard for a PC, for example, or as may be provided via a network interface unit or card, for example, providing further additional capabilities introduces additional expense into the computing platform.

For example, it is becoming desirable to have the capability for the computing platform to engage in such network management operations even when a host processor and a host operating system of the platform being managed remotely are not operating, assuming the platform, of course, includes a host processor and operating system. For example, the host processor and operating system may not be operating properly or, alternatively, the host processor may be in a low power state. Typically, providing this additional functionality would involve the expense of providing an ethernet controller or similar hardware having operating capability to engage in communications via the network even when the host processor is "off-line". However, providing such a controller in addition to the standard network communications capability that is now typically provided with some computing platforms introduces additional, undesirable expense. A need, therefore, exists to provide this network communications capability between the computing platform and the network even when the host processor, for example, is off-line without introducing the expense of an additional ethernet controller, for example.

SUMMARY

Briefly, in accordance with one embodiment of the invention, a platform bus interface unit includes circuitry to divide a received network protocol compliant signal packet into signal packets of a smaller size for transmission over a platform bus of at least a portion of the data provided by the network protocol compliant signal packet.

Briefly, in accordance with another embodiment of the invention, an integrated circuit includes circuitry to transmit over a platform bus at least a portion of the data provided by a network protocol compliant signal packet as signal packets of a smaller size.

Briefly, in accordance with still another embodiment of the invention, a method of transmitting at least a portion of the data provided by a network protocol compliant signal packet over a platform bus includes the following. At least a portion of the data provided by the network protocol compliant signal packet is divided into smaller data subsets. The smaller data subsets are transmitted over the platform bus as platform bus protocol compliant signal packets. The maximum amount of data capable of being provided by a network protocol compliant signal packet exceeds the maximum amount of data capable of being provided by a platform bus protocol compliant signal packet.

Briefly, in accordance with still yet another embodiment of the invention, a method of combining into a network protocol compliant signal packet at least a portion of the data provided by separate signal packets received over a platform signal bus includes the following. At least a portion of the data provided by the signal packets received is extracted. The extracted data is assembled into a single network protocol compliant signal packet.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 6 and 7 are truth-tables illustrating the bit settings for the embodiments of FIGS. 2 and 3.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in details so as not to obscure the present invention.

As previously described, it has become advantageous to provide computing platforms with the capability to be managed by a remote network management application. One advantage of providing this capability is that it may provide a remote network management application the ability to diagnose problems with a remote computing platform as well as, in some instances, the capability to solve such problems, such as, for example, by providing software updates via the network coupled to the computing platform. It is assumed, in this environment, that a separate microcontroller coprocessor, application specific integrated circuit (ASIC) or the like is provided so that communications over the network may be accomplished via a communications path separate from the primary communications path to the host processor. This capability is desirable for those instances in which the host processor or other primary computing device for the platform is not operating properly or is "off-line". Another advantage of providing this network management capability is that it may provide the opportunity to perform operations over the network when the host processor or other primary computing device is either off or is in a low power mode. Furthermore, this may provide the capability to execute or accomplish a remote "wake-up" call by the remote network management application or, alternatively, provide the capability for the managed computing platform to provide signaling over the network so that the remote network management application is aware that the managed computing platform is coupled to the network, although, perhaps while in a low power state.

Figure 1:
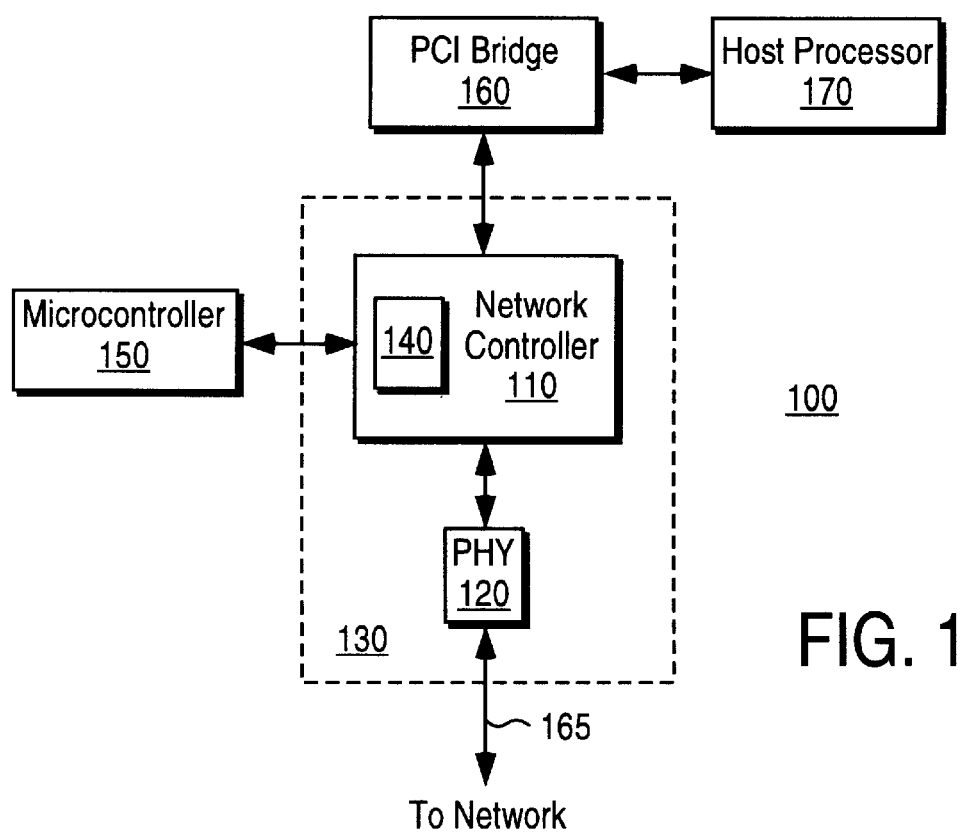
FIG. 1 is a block diagram illustrating an embodiment of a computing platform that may employ an embodiment of a method and apparatus for transmitting and/or receiving network protocol compliant signal packets over a platform bus in accordance with the present invention.

As previously indicated, one issue associated with providing this capability includes providing the circuitry to support this network communications without the expense of a separate network or ethernet controller other than the network controller typically provided, for example, on the motherboard or, alternatively, as another example, on a network interface unit or card. Assuming the host processor is unavailable, such as host processor 170 illustrated in FIG. 1, then PCI bridge circuitry 160 is not a viable communications path in such a situation. PCI bridge circuitry is, of course, only provided here as an example, and the invention is in no way restricted to systems that may comply with this protocol. Nonetheless, in this context, PCI refers to the PCI local bus specification 2.0 or 2.1, as is well-known and available from the PCI Special Interest Group, 2575 NE Kathryn Street, #17, Hillsboro, Oreg. 97124. Although a separate PCI bridge and PCI interface unit (not shown) might be provided, instead, as illustrated in FIG. 1, microcontroller 150, or the like, such as an ASIC or even a chip set including the desired capability, is coupled via a platform bus 155 to platform bus interface unit 140, which in this particular embodiment is included in network controller 110. In this context, the term platform bus refers to a signal bus employed entirely within a computing platform to communicate signals between components within the platform. Typically, such platform buses comply with a known signaling protocol, such as, for example, the previously referenced PCI specification, although the invention is not limited in scope in this respect. In this context, the term platform bus is intended to be generic and not refer to any particular protocol. In this particular embodiment, although the invention is not limited in scope in this respect, the signaling across platform bus 155 complies with a platform bus protocol known as the System Management Bus Specification, or SM Bus. Although the invention is not limited in scope in this respect, the current version of the System Management Bus Specification, Revision 1.0, published Feb. 15, 1995, is available from any one of the members of the Special Interest Group, including Benchmarq Microelectronics, Inc., Duracell Inc., Energizer Power Systems, Intel Corp., Linear Technology Corp., Maxim Integrated Products, Mitsubishi Electric Corp., National Semiconductor Corp., Toshiba Nattery Co., and Varta Batterie AG. In this particular embodiment, this platform bus protocol comprises a legacy or preexisting platform bus protocol. Although the invention is not limited in scope in this respect, employing a pre-existing or legacy protocol provides, for this embodiment, some advantages. For example, because this is a legacy platform bus protocol, this technology is currently available on motherboards, computing platforms, and the like. Other desirable aspects include: a low pin count, relative ease of use and relatively low speed, therefore providing a relatively low cost approach. As is well-known, the SM bus protocol is a protocol layer on top of the $i_2c$ or Inter-IC bus specification. Again, although the invention is not limited in scope in this respect, the current 1995 update version of the $i_2c$ bus specification is available from Phillips Semiconductors, or, alternatively, it may be obtained from the World Wide Web at the following URL: http://wwwus2.semiconductors.philips.com/i2c/facts/#whatis. Although the invention is not limited in scope in this respect, for this particular embodiment, three signaling lines or couplings are employed, comprising, here, a serial data line, a serial clock line and a serial alert line, as shall be explained in more detail hereinafter. In this particular embodiment, because the previously described platform bus protocol is employed, the signaling that occurs across platform bus 155 occurs in the range of ten kilohertz to 100 kilohertz, although the invention is not limited in scope in this respect.

As previously described, employing a preexisting or legacy platform bus protocol provides several advantages including backward compatibility; however, for the SM bus protocol, for example, limitations exist. For this particular platform bus protocol, the platform bus protocol is limited to transmitting no more than 32 data bytes in a single signal packet that complies with the platform bus protocol. However, network protocol compliant signal packets, such as, for example, signal packets that comply with the Ethernet protocol may include up to 1518 data bytes. The Ethernet protocol is described in the IEEE 802.3 specification, published in 1996, (hereinafter referred to as the "Ethernet specification"). Another well-known protocol is the Gigabit Ethernet protocol describe in the IEEE 802.3z specification (hereinafter referred to as the "Gigabit Ethernet specification"). These specifications are available from the IEEE Standards Department, Copyright Information, 445 Hoes Lane, P.O. Box 1331, Piscataway, N.J. 08855-1331. See, for example, the CSMA/CD Access Method Standards Package, also available from the IEEE. Hereinafter, the term Ethernet protocol is intended to refer to any LAN (Local Area Network) using CSMA/CD (Carrier Sense Multiple Access with Collision Detection), including those employing protocols or complying with specifications commonly referred to as Ethernet, Fast Ethernet or Gigabit Ethernet. As the previous discussion illustrates, the smaller-sized signal packets of the platform bus protocol have a maximum length that is less than the maximum length of a network protocol compliant signal packet. More specifically, the maximum amount of data capable of being provided by a network compliant signal packet, in this particular embodiment, exceeds the maximum amount of data capable of being provided by the platform bus protocol compliant signal packet. However, as previously described, in this particular embodiment, platform bus 155 is intended to provide a signal path through network controller 110 and physical protocol layer (PHY)120 to the network via network link 165.

This desired signaling may be accomplished, in this embodiment, by platform bus interface unit 140 including circuitry to divide a received network protocol compliant signal packet into signal packets of a smaller size for transmission over the platform bus of at least a portion of the data provided by the network protocol compliant signal packet. Likewise, it would also be desirable for the circuitry to include the capability to assemble at least a portion of the data provided by separate smaller-sized signal packets, received via platform bus 155, into a network protocol compliant signal packet. Therefore, microcontroller 150, in this embodiment, would have the capability to provide data to network controller 110 for transmission to the network as well as having the capability to receive data from the network.

Although there may be many ways in which to divide data obtained from a network protocol compliant signal packet so that it may be transmitted as several, smaller, separate platform bus protocol signal packets, or, alternatively, to take a plurality of platform bus protocol compliant signal packets and combine the data from these signal packets into a network protocol compliant signal packet, in one embodiment in accordance with the invention, it would be advantageous if the technique employed to accomplish this did not introduce an additional protocol layer on top of the platform bus protocol, such as a transaction layer, although, of course, the invention is not limited in scope in this respect. Alternatively, it would be desirable if in this embodiment, such signaling were incorporated into the platform bus protocol in a manner that was backward compatible with the platform bus protocol, although, again, the invention is not limited in scope in this respect. This way, for such an embodiment, the signaling would be entirely backward compatible and, therefore, the current legacy or pre-existing platform bus protocol could be employed without making modifications that might either introduce additional expense or otherwise delay the diffusion of this capability. In addition, if this capability were accomplished at the platform bus protocol level, it would be accomplished across all signal packets and signaling occurring via the platform bus, again reducing complexity, such as, for example, where multiple devices might be employed. It would also be desirable if this could be accomplished in some embodiments without introducing additional signaling overhead.

Figure 2:
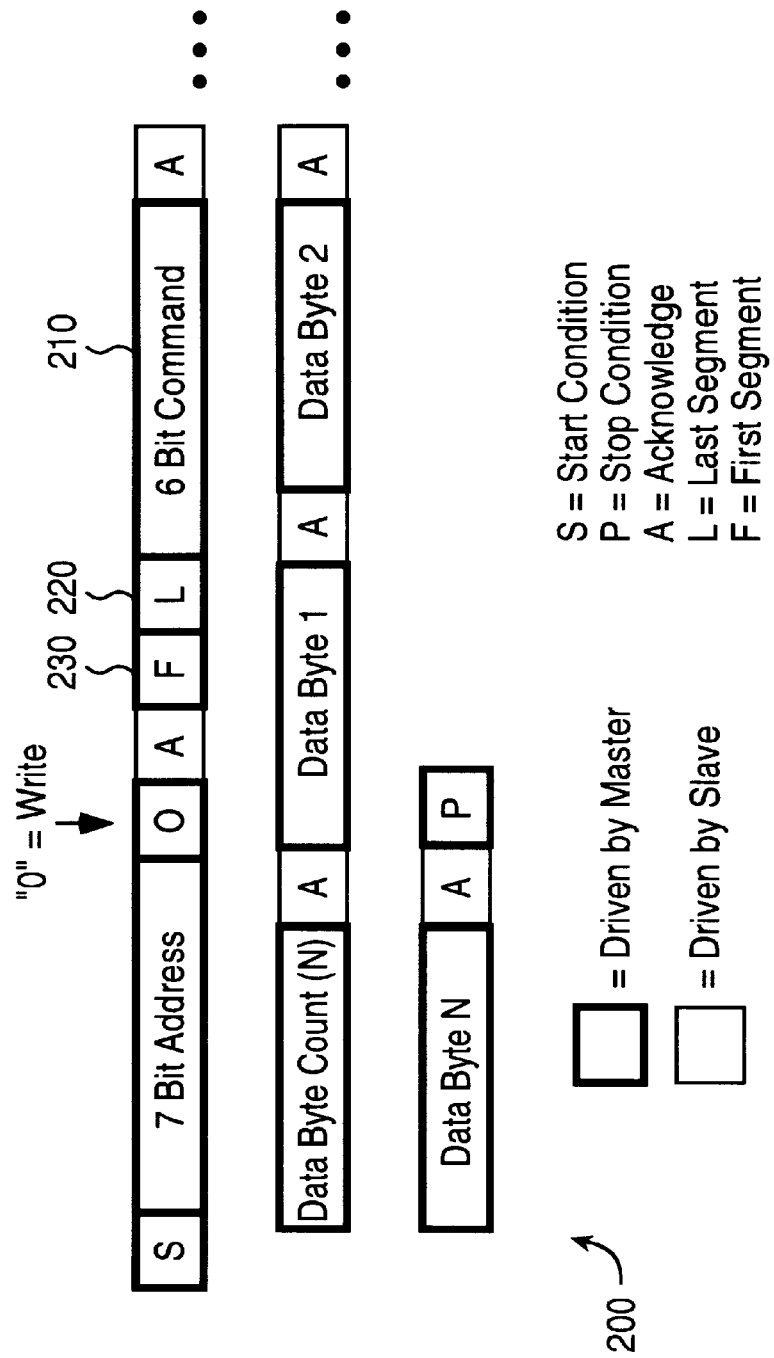
FIG. 2 is a schematic diagram illustrating an embodiment of a platform bus protocol compliant signal packet that may be employed by an embodiment of a method and apparatus for transmitting network protocol compliant signal packets over a platform bus in accordance with the invention.
Figure 4:
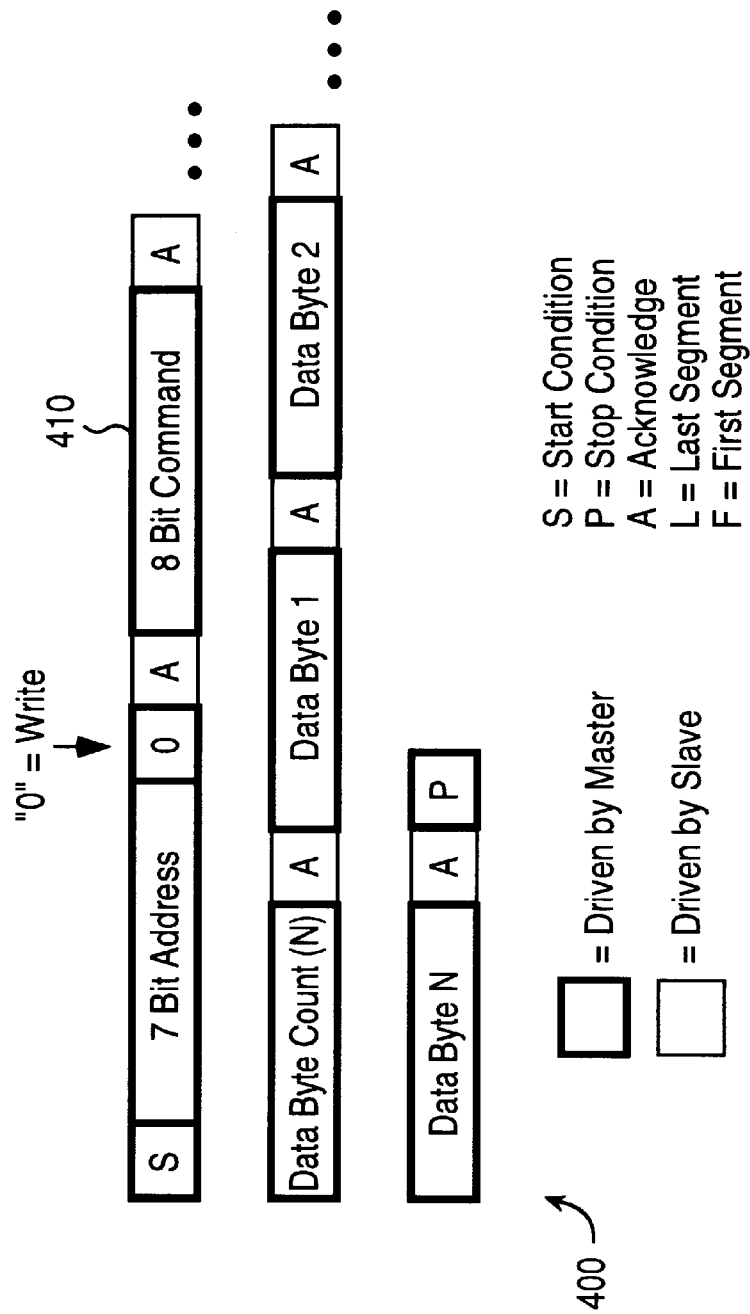
FIGS. 4 and 5 are schematic diagrams of prior art platform bus protocol compliant signal packets.

FIG. 2 is a schematic diagram illustrating an embodiment of a signaling packet that may be employed by a method and apparatus for transmitting network protocol compliant signal packets over a platform bus in accordance with the present invention. In contrast, FIG. 4 is a schematic diagram illustrating a signal packet executing a block write command, as described in the previously referenced SM bus specification. As illustrated, similarities exist between the two signal packets. However, in this particular embodiment, command 410 of signal packet 400 is replaced by command 210 and bits 220 and 230. Bits 220 and 230 provide signaling that may be employed when signal packets are being transmitted over platform bus 155 so that circuitry, such as may be incorporated in platform bus interface unit 140 in this particular embodiment, includes the capability to assemble at least a portion of the data provided by separate, smaller sized platform bus protocol compliant signal packets received via the platform bus into a network protocol compliant signal packet. In this particular embodiment, although the invention is not limited in scope in this respect, this capability is embodied within a signal packet accomplishing a block write because microcontroller 150 in this embodiment operates as a master with respect to platform bus interface unit 140, which operates as a slave in this embodiment. Therefore, in this embodiment, microcontroller 150 writes the data to platform bus protocol interface unit 140. FIG. 6 is a truth table illustrating, for this particular embodiment, the setting of bits 220 and 230 in order to accomplish the desired capability. Of course, the invention is not limited in scope to the particular bit settings illustrated. Likewise, the invention is not limited in scope to employing a modification of the SM bus block write command, as previously described, in order to accomplish the desired result. Any one of a number of different embodiments within the scope of the invention are possible. Nonetheless, in this particular embodiment, as indicated in FIG. 6, the setting of bits 220 and 230, the L bit and F bit respectively in this embodiment, provide signaling to platform bus interface unit 140 indicating the first block of a fragmented signaling stream, the last block of a fragmented signaling stream, and blocks located between the first block and the last block of the fragmented signaling stream, referred to here as middle blocks. Of course, in some situations, a single block may be employed to communicated 32 data bytes or less. As illustrated, in FIG. 6 signaling to indicate this is likewise provided in this particular embodiment.

As the foregoing description illustrates, in addition to the advantages previously described, one advantage of this particular embodiment is that the desired result is accomplished without additional signaling overhead being introduced into the legacy platform bus interface protocol. As a comparison of FIGS. 2 and 4 illustrate, no additional signals are transmitted in order to signal to the receiving unit, in this particular embodiment, platform bus interface unit 140, the fragmented signaling stream being employed. As the FIGs. in the prior description illustrate, instead eight bit command 410 is replaced with six bit command 210 so that bits 220 and 230, the L bit and F bit respectively in this embodiment, may provide the desired signaling previously described. Although in this embodiment, the possibility of having 256 commands is reduced to 32 commands for the six bit command of FIG. 2, this is not a significant disadvantage in this embodiment. For transmitting and/or receiving signal packets via platform bus, 32 commands is adequate, or even more than adequate, to accomplish the desired results.

Likewise, as previously indicated, the invention is not limited in scope to the embodiment illustrated in FIG. 2. For example, in an alternative embodiment, a network protocol compliant signal packet may be transmitted via a platform bus, such as platform bus 155, by first transmitting a signal packet indicating the start of a fragmented signaling stream, then a plurality of write block commands, for example, may be employed to transmit at least a portion of the data provided by a network protocol compliant signal packet, and then a signal packet indicating the end of the fragmented signaling stream may be transmitted. Although this approach introduces additional signaling overhead, it, nonetheless, still has many of the advantages previously described, such as ease of use, low pin count, etc.

Another advantage of the previously described embodiments may occur in an environment in which the hardware implementation includes a platform bus capable of being driven by several master devices. In such an environment, at various times, more than one of these devices may desire access to the platform bus in order to transmit and/or receive signal packets. Therefore, in addition to the previously described advantages associated with employing a legacy platform bus protocol, another advantage of dividing at least a portion of the data provided by a network protocol compliant signal packet into a plurality of platform bus protocol compliant signal packets is that the smaller signal packets may be interleaved for transmission over platform bus 155, thereby at times potentially reducing latency for communications occurring over the platform bus at least. In embodiments in which the platform bus employed is relatively low speed, which may be desirable in some circumstances in order to reduce cost, this feature may prove to be desirable.

Yet another advantage of an embodiment in accordance with the present invention, such as the previously described embodiments, is the capability to execute independent operations interleaved with the data provided by the particular platform bus protocol compliant signal packets. More specifically, for example, where the SM bus protocol is employed, as illustrated in FIG. 2, up to 32 different commands may be specified in a signal packet. Therefore, where at least a portion of the data provided by a network compliant signal protocol packet is being divided into a plurality of platform bus protocol compliant signal packets, each of the platform bus protocol compliant signal packets may specify a different and independent command so that different and independent operations may be performed. For example, although the invention is not limited in scope in this respect, if more than one microcontroller or ASIC is being employed in an embodiment, an advantage includes the capability to interleave the signal packets transmitted from these microcontrollers or ASICs, rather than waiting for one fragmented signaling stream to be completely transmitted before transmitting another. Likewise, again, although the invention is not limited in scope in this respect, this capability may provide an advantage for transmitting signal packets to the microcontroller or ASIC, such as, for example, where it may be desirable to interleave other commands, such as status commands, for example, with a fragmented signaling stream.

Figure 3:
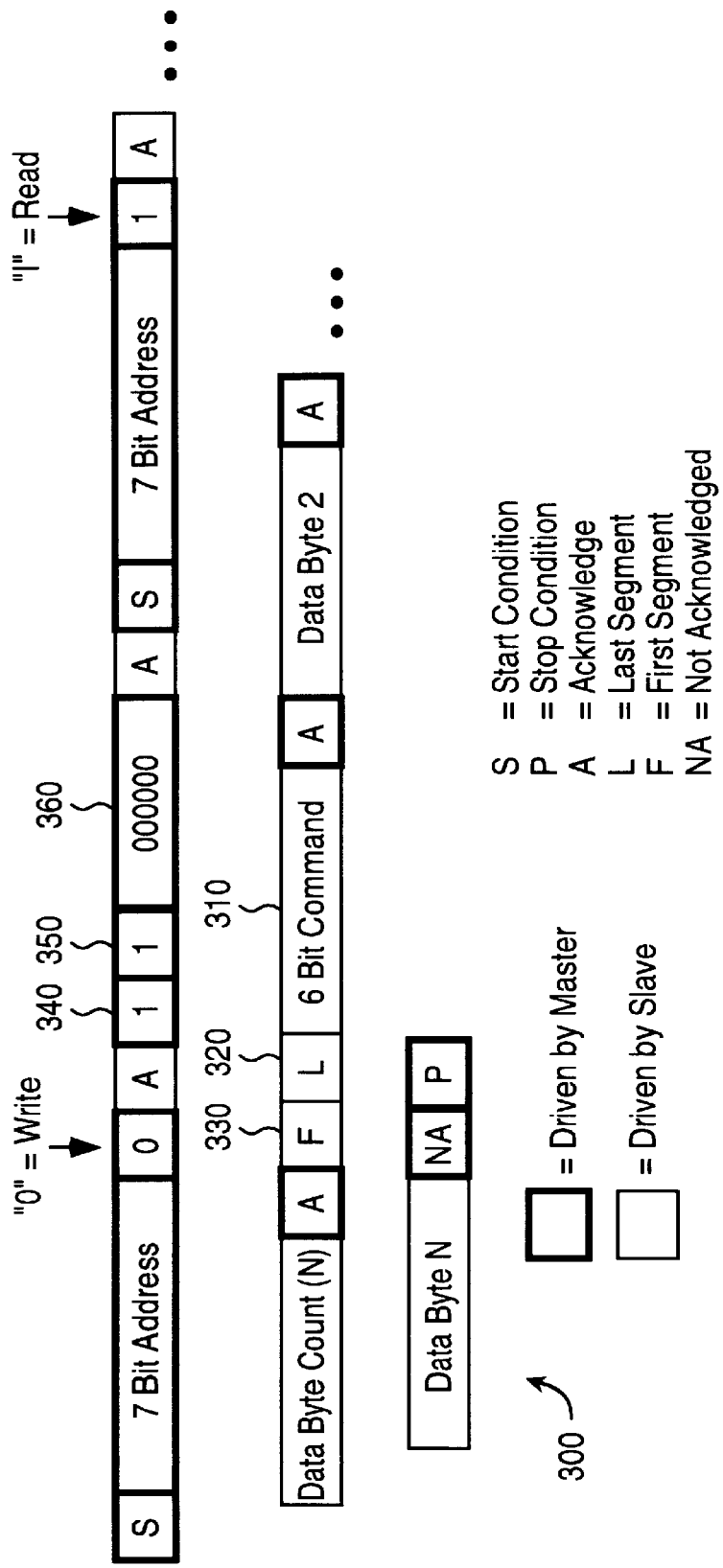
FIG. 3 is a schematic diagram illustrating an embodiment of a platform bus protocol compliant signal packet that may be employed by an embodiment of a method and apparatus for receiving network protocol compliant signal packets over a platform bus in accordance with the present invention.
Figure 5:

FIG. 3 is a schematic diagram illustrating another embodiment of a signal packet and may be employed by an embodiment of a method and apparatus for receiving network protocol compliant signal packets over platform signal bus in accordance with the present invention. In contrast, FIG. 5 is a schematic diagram illustrating a SM bus block read command. As with the embodiment illustrated in FIG. 2, the embodiment illustrated in FIG. 3 has similarities with signal packet illustrated in FIG. 5 implementing a SM bus block read command. Likewise, FIG. 7 is a truth-table illustrating the settings for the F and L bits for the embodiment of FIG. 3, although the invention is not limited in scope to this embodiment.

An aspect of this particular embodiment, although the invention is not limited in scope in this respect, relates to the relationship between a master device, microcontroller 150 in this particular embodiment illustrated in FIG. 1, and a slave device, platform bus interface 140 illustrated in FIG. 1 for this embodiment. For this particular embodiment, the master reads signal packets from platform bus interface unit 140. However, because the platform bus interface unit is the device providing the signal packets in order to be backward compatible with the SM bus protocol, in this particular embodiment, the signal packet composition is structured so that the slave, in this particular embodiment platform bus protocol interface 140, provides the signals to the signal packet implementing the block read command so that the desired amount of data is transferred from the slave to the master. For example, referring to FIG. 3, in comparison with FIG. 5, data byte one is replaced by six bit command 310, L bit 320, and F bit 330. For the SM bus protocol, it is the slave that drives the signaling for this data byte. Likewise, a reason the command portion of the signal packet illustrated in FIG. 5 is not employed is because this portion of the signal packet, is illustrated in FIG. 3, is driven by the master, in this particular embodiment controller 150. Nonetheless, for this particular embodiment, although the invention is not limited in scope in this respect, command 510 of FIG. 5 is replaced by F bit 340, a logical "1" here, and L bit 350, a logical "1" here, as well as nulls or zeros, indicated in the FIG. 3 by the designation 360. In this embodiment, although the invention is not limited in scope in this respect, through this mechanism, microcontroller 150, or the master, signals to the slave that a block read is about to be implemented. In alternative embodiments, of course, this may be omitted, and is provided in this instance to maintain backward compatibility.

In this particular embodiment, platform bus interface unit 140 includes circuitry to divide a received network protocol compliant signal packet into signal packets that are smaller sized for transmission over the platform bus of at least a portion of the data provided by the network protocol compliant signal packet. As previously described, in this particular embodiment, a legacy platform bus interface protocol is employed and a legacy network protocol is employed. Therefore, the smaller-sized packets have a maximum length that is less than the maximum length of the network protocol compliant signal packets. In this particular embodiment, in which a microcontroller operates as a master and the platform bus interface unit operates as a slave, however, it is the platform bus interface unit that receives the network protocol compliant signal packet. This indicates the desirability of a mechanism for the platform bus interface unit to signal to the microcontroller that a network protocol compliant signal packet has been received, at least for this embodiment. In this particular embodiment, although the invention is not limited in scope in this respect, as previously described, a wire or coupling between microcontroller 150 and interface unit 140 includes a serial alert line, in addition to a serial clock line and a serial data line. This alert line in this embodiment operates as a type of interrupt to microcontroller 150, indicating to the microcontroller that a network protocol compliant signal packet has arrived and that a read command should be initiated by the microcontroller. Of course, alternative embodiments may not employ this approach. Likewise, for the previously described embodiment, illustrated in FIG. 2, such alert signaling is omitted.

Unlike the embodiment described and illustrated with respect to FIG. 2, this particular embodiment does not accomplish transmission without adding additional signaling overhead. Instead of transmitting a maximum of 32 data bytes, in this particular embodiment, where a read command is implemented, a maximum of 31 data bytes are transferred. In an alternative embodiment, however, even more additional overhead may be added. For example, an approach in which separate signaling packets indicate the start of a fragmented signal stream and the end of a fragmented signal stream may be employed. Therefore, while the embodiment illustrated in FOG. 3 includes some additional signaling overhead, it still may have advantages in this regard in comparison with other embodiments having greater signaling overhead because it omits these additional signaling packets. The embodiment of FIG. 3, therefore, allows the device to be a slave, which typically employs less complex logic that a master, while also conserving overhead by allowing the slave to specify the data type being transmitted to the master. Of course, alternative approaches within the scope of the invention are also possible.

The desirability of employing one of the alternative embodiments will vary depending upon the application and the particular embodiment. Although the embodiment previously described in which two additional signaling packets are employed to indicate the beginning and end of the fragmented signaling stream does not provide the advantage of little or no additional signaling overhead, nonetheless, many of the other advantages previously described are provided. For example, as previously described, the separate smaller size signaling packets include the capability to execute different independent operations.

A variety of alternative embodiments have been provided and the invention is not limited in scope to any particular embodiment. For example, FIG. 1 illustrates a plurality of integrated circuit chips implementing embodiments in accordance with the present invention. Nonetheless, the invention is not limited in scope to the particular configuration of integrated chips illustrated in FIG. 1 and, alternatively, embodiments may be implemented employing a single integrated circuit chip, more integrated circuit chips than illustrated in FIG. 1, less integrated circuit chips than illustrated in FIG. 1 or, alternatively, embodiments may be implemented in circuitry other than embodied in integrated circuit chips. Likewise, FIG. 1 illustrates platform bus interface unit 140 implemented or included on a motherboard, however, the invention is not limited in scope in this respect. For example, in an alternative embodiment, the platform bus interface unit may be included on a network interface unit that couples to a motherboard. Likewise, some embodiments may be employed in contexts totally apart from a motherboard configuration.

Still another embodiment in accordance with the present invention includes an embodiment of a method of transmitting at least a portion of the data provided by a network protocol compliant signal packet over a signal bus as follows. At least a portion of the data provided by the network protocol compliant signal packet may be divided into smaller data subsets. The smaller data subsets may be transmitted over the platform bus as platform bus protocol compliant signal packets. For example, although the invention is not limited in scope in this respect, the embodiment illustrated in FIG. 1 includes the capability to implement these operations. As previously indicated, for that embodiment, the maximum amount of data capable of being provided by the network compliant signal packet exceeds the maximum amount of data capable of being provided by the platform bus protocol compliant signal packet. Likewise, for this particular embodiment, the platform bus protocol may comprise a preexisting or legacy platform bus protocol. For example, although the invention is not limited in scope in this respect, the SM bus protocol or specification may be employed or complied with, such as by the embodiment illustrated in FIG. 1. Again, for the embodiment illustrated in FIG. 1 and described with respect to FIG. 3, the dividing and transmitting is accomplished without adding additional signaling overhead, although other embodiments may include such overhead and the desirability of including or excluding such overhead may vary depending upon the particular application and environment.

Still another embodiment in accordance with the present invention includes an embodiment of a method of combining into a network protocol compliant signal packet at least a portion of the data provided separate signal packets received over a platform signal bus as follows. In this embodiment, at least a portion of the data provided by the signal packets received is extracted. The extracted data is assembled into a single network protocol compliant signal packet. For this embodiment, extracting includes determining a first received signal packet containing data to be extracted and determining a last received signal packet containing data to be extracted. One approach that may be employed, although the invention is not limited in scope in this respect, is the approach described and illustrated with respect to FIG. 2. In addition, depending upon the situation, extracting may further include determining middle signal packets containing data to be extracted. In this context, middle signal packets are signal packets between the first received signal packet and the last received signal packet. Likewise, as previously described, in some embodiments, this extracting and assembling may be accomplished with little or no additional signaling overhead, although in alternative embodiments additional packets, as overhead, may be provided.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A platform bus interface unit comprising:
   circuitry to:
   divide a received network protocol compliant signal packet into signal packets of a smaller size for transmission over a platform bus of at least a portion of the data provided by the network protocol compliant signal packet; and
   transmit the smaller-sized signal packets over the platform bus as platform bus protocol compliant signal packets, the platform bus protocol compliant signal packets complying with an SM (System Management) bus protocol, the SM bus protocol being a legacy platform bus protocol, and the SM bus protocol compliant signal packets including a first (F) bit and a last (L) bit placed in the SM bus protocol compliant signal packets to signal those packets included in a particular fragmented signaling stream being transmitted.

2. The platform bus interface unit of claim 1, wherein separate ones of the smaller-sized signal packets include the capability to execute different, independent operations that have been interleaved for transmission over the platform bus.

3. The platform bus interface unit of claim 1, wherein the network protocol compliant signal packet complies with a legacy network signal packet protocol.

4. The platform bus interface unit of claim 1, wherein the circuitry additionally includes the capability to assemble at least a portion of the data provided by separate smaller-sized signal packets received via a platform bus into a network protocol compliant signal packet.

5. The platform bus interface unit of claim 4;
   the circuitry being further adapted to assemble the at least a portion of the data provided by the separate smaller-sized signal packets into the network protocol compliant signal packet without additional signaling overhead.

6. The platform bus interface unit of claim 5, wherein the separate, smaller-sized signal packets include the capability to execute different, independent operations with respect to the data provided by the particular signal packets.

7. An integrated circuit comprising:

circuitry to transmit over a platform bus at least a portion of the data provided by a network signal packet as signal packets of a smaller size, the smaller-sized signal packets being transmitted over the platform bus as platform bus protocol compliant signal packets, and complying with an SM (System Management) bus protocol, the SM bus protocol being a legacy platform bus protocol, and the SM bus protocol compliant signal packets including a first (F) bit and a last (L) bit placed in the SM bus protocol compliant signal packets to signal those packets included in a particular fragmented signaling stream being transmitted.

8. The integrated circuit of claim 7, wherein said integrated circuit additionally includes the capability to assemble at least a portion of the data provided by separate smaller signal packets received via a platform bus into a network protocol compliant signal packet.

9. A method of transmitting at least a portion of data provided by a network protocol compliant signal packet over a platform bus comprising:

dividing at least a portion of the data into smaller data subsets; and transmitting the smaller data subsets over the platform bus as platform bus protocol compliant signal packets, the platform bus protocol compliant signal packets complying with an SM (System Management) bus protocol, the SM bus protocol being a legacy platform bus protocol, and the SM bus protocol compliant signal packets also include a first (F) bit and a last (L) bit placed in the SM bus protocol compliant signal packets to signal those packets included in a particular fragmented signaling stream being transmitted;

wherein the maximum amount of data capable of being provided by the network compliant signal packet exceeds the maximum amount of data capable of being provided by the SM bus protocol.

* * * * *